United States Patent
Alm et al.

(10) Patent No.: US 10,115,247 B2
(45) Date of Patent: Oct. 30, 2018

(54) METHOD AND ARRANGEMENT FOR CONTROLLING CHARGING OF AN ELECTRICAL STORAGE SYSTEM IN A VEHICLE INCLUDING MEASURING POWER LOSS OVER CONNECTOR ELEMENTS DURING CHARGING AND GENERATING AN ERROR SIGNAL BASED ON POWER LOSS

(71) Applicant: VOLVO TRUCK CORPORATION, Göteborg (SE)

(72) Inventors: Filip Alm, Bohus (SE); Jerker Lennevi, Lerum (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/309,056

(22) PCT Filed: May 5, 2014

(86) PCT No.: PCT/EP2014/001187
§ 371 (c)(1),
(2) Date: Nov. 4, 2016

(87) PCT Pub. No.: WO2015/169326
PCT Pub. Date: Nov. 12, 2015

(65) Prior Publication Data
US 2017/0124783 A1 May 4, 2017

(51) Int. Cl.
*H02J 7/00* (2006.01)
*G07C 5/08* (2006.01)
(Continued)

(52) U.S. Cl.
CPC .............. *G07C 5/0808* (2013.01); *B60K 6/48* (2013.01); *B60L 3/04* (2013.01); *B60L 5/24* (2013.01);
(Continued)

(58) Field of Classification Search
CPC ......... H02J 7/0021; H02J 7/0045; B60L 3/04; B60L 5/24; B60L 11/1816;
(Continued)

(56) References Cited

U.S. PATENT DOCUMENTS

2011/0030574 A1* 2/2011 Kitanaka ................... B60L 5/28
105/49
2012/0287542 A1* 11/2012 Bianco ................ B60L 11/1816
361/86
2015/0231986 A1* 8/2015 Li ......................... B60L 11/123
701/22

FOREIGN PATENT DOCUMENTS

GB 2 256 178 A 12/1992
JP 2005 287184 A 10/2005

OTHER PUBLICATIONS

International Search Report (dated Jan. 26, 2016) for corresponding International App. PCT/EP2014/001187.
(Continued)

*Primary Examiner* — Nathaniel Pelton
(74) *Attorney, Agent, or Firm* — WRB-IP LLP

(57) ABSTRACT

A method is provided for controlling charging of an electric energy storage system in a vehicle including an electric machine which is arranged for propulsion of the vehicle. The method includes initiating the charging upon connection of the energy storage system to an external power supply via a first connector element associated with the vehicle and a second connector element associated with the external power supply, and monitoring a contact resistance defined by the connection of the connector elements. Furthermore, (Continued)

the method includes measuring and calculating the power loss over the connector elements during the charging, and generating an error signal if the power loss is higher than a predetermined threshold value, the error signal being dependent on the magnitude of the power loss. An arrangement for controlling charging of an electric energy storage system in a vehicle is also provided.

15 Claims, 3 Drawing Sheets

(51) Int. Cl.
  *B60L 3/04* (2006.01)
  *B60L 11/18* (2006.01)
  *B60K 6/48* (2007.10)
  *B60L 5/24* (2006.01)

(52) U.S. Cl.
  CPC ......... *B60L 11/1816* (2013.01); *H02J 7/0021* (2013.01); *H02J 7/0045* (2013.01); *B60K 2006/4825* (2013.01); *B60L 11/1837* (2013.01); *B60L 11/1877* (2013.01); *B60L 2200/18* (2013.01); *B60L 2240/36* (2013.01)

(58) Field of Classification Search
  CPC .............. B60L 11/1837; B60L 11/1877; B60L 2200/18; B60L 2240/36
  USPC ........................................................ 320/109
  See application file for complete search history.

(56) References Cited

OTHER PUBLICATIONS

International Prelimanry Report on Patentability (dated Jul. 20, 2016) for corresponding International App. PCT/EP2014/001187.

\* cited by examiner

METHOD AND ARRANGEMENT FOR CONTROLLING CHARGING OF AN ELECTRICAL STORAGE SYSTEM IN A VEHICLE INCLUDING MEASURING POWER LOSS OVER CONNECTOR ELEMENTS DURING CHARGING AND GENERATING AN ERROR SIGNAL BASED ON POWER LOSS

BACKGROUND AND SUMMARY

The invention relates to a method for controlling charging of an electric energy storage system in a vehicle comprising an electric machine which is arranged for propulsion of said vehicle, said method comprising: initiating said charging upon connection of said energy system to an external power supply via a first connector element associated with said vehicle and a second connector element associated with said external power supply; and monitoring a contact resistance defined by the connection of said connector elements.

The invention also relates to an arrangement for controlling charging of an electric energy storage system in a vehicle comprising an electric machine which is arranged for propulsion of said vehicle, said arrangement comprising a vehicle control unit arranged in said vehicle for initiating charging upon connection of said energy storage system to an external power supply via a first connector element associated with said vehicle and a second connector element associated with said external power supply; said vehicle control unit being configured for monitoring a contact resistance defined by the connection of said connector elements.

The invention can be applied in heavy-duty vehicles, such as cars, trucks, buses and construction equipment. Although the invention will be described with respect to an application in the form of a bus, the invention is not restricted to this particular type of vehicle, but may be used in other vehicles.

In the field of vehicles, there is a steady increase in research and development related to propulsion of vehicles with alternative power sources, i.e. power sources being used as alternatives to conventional internal combustion engines.

An internal combustion engine, for example in the form of a gasoline engine or a diesel engine, offers high efficiency with relatively low fuel consumption. However, environmental concerns have led to an increase in development of more environmental-friendly power sources for vehicles. In particular, it can be noted that electrically operated vehicles has emerged as a promising alternative.

Today, there exist various types of vehicle propulsion systems comprising electric machines. For example, a vehicle can be operated by means of an electric machine solely, or by means of an arrangement comprising both an electric machine and an internal combustion engine. The latter alternative is often referred to as a hybrid vehicle (HEV), and can for example be utilized in a manner in which an internal combustion engine is used for operating the vehicle while driving outside urban areas whereas the electric machine can be used in urban areas or in environments in which there is a need to limit the discharge of harmful pollutants such as carbon monoxide and oxides of nitrogen.

The technology involved in electrically operated vehicles is closely related to the development of electrical energy storage systems, such as battery-related technology for vehicles. Today's electrical energy storage systems for vehicles may comprise a set of rechargeable battery cells which, together with control circuits, form a unit which is arranged in a vehicle and which is configured for operating an electric machine. A hybrid vehicle is also often arranged so that the energy storage system is charged during braking, by means of a process known as regenerative braking.

A vehicle which is operated by means of an internal combustion engine and an electric machine supplied with power from a rechargeable electrical energy storage system is sometimes referred to as a plug-in hybrid electric vehicle (PHEV). A plug-in hybrid electric vehicle uses an energy storage system with rechargeable batteries or another suitable energy source which can be restored into a condition involving a full charge through a connection to an external electric power supply. The external power supply can be in the form of the common electric grid power system which can be accessed via a conventional power cord, or can be in the form of other arrangements depending on the vehicles involved and the power need for the recharging process.

During charging, a high amount of energy must be fed into the energy storage system in a relatively short time in order to optimize the vehicle's range of driving. For this reason, the actual charging of the energy storage system is suitably implemented through a process in which a control unit on the vehicle requests a charging process to be carried out by means of an external electric power supply. This is carried out after the energy storage system and the external power supply have been electrically connected by means of suitable connector elements.

The connector elements can for example be in the form of a pantograph on the vehicle and an electrically conductive overhead wire being associated with the external power supply. In this manner, the onboard energy storage system can be connected to the external power supply for the purpose of charging said energy storage system. Other types of connector elements also exist.

When charging the energy storage system, the external charger controls the charging process by feeding a charging current through the conductive wire. A problem may arise through the fact that the two connector elements may be exposed to heavy and intensive use and also environmental influence, such as rough weather conditions. The contact surfaces on the connector elements may be worn out, especially if the connectors are used frequently, i.e. if they are frequently connected and disconnected. All these factors may contribute to excessive wear of the connector elements.

If the connector elements are worn, the contact resistance defined by the contact points of the connector elements may be relatively high. This may lead to a high loss of power in the contact point of the connector elements, which in turn may cause high temperature and in some cases even fire. For reasons of safety and cost, there is obviously a desire to avoid such conditions in which there is a risk for a high power loss in the contact interface between the connector elements.

In particular, the above-mentioned scenario may occur in connection with plug-in hybrid vehicles with high power electric components (in the magnitude of 100 kW) where the power variation is big and fast and the space for components is small and wherein there is a need for well-designed platform thinking.

The patent document US 2011/030574 discloses an electric car which is supplied with electric power by means of an electric power supply. The electric car comprises a connector element in the form of a pantograph which is associated with a temperature sensor close to the contact point between the pantograph and an overhead conductor portion connector the power supply. A temperature sensor is arranged close to the pantograph and is used for measuring the temperature, which in turn can be used as an indication of the contact resistance between the overhead conductor and the pantograph.

Even though the arrangement according to US 2011/030574 is intended to detect an abnormality of the contact portion between the connector elements, there is still a need for a more reliable, accurate and useful processes and devices for detecting the power loss over two connector elements and for controlling charging of an electric energy storage system based on such a process.

Consequently, it is desirable to provide a method and an arrangement by means of which the problem with increased temperature, possible overheating and even fire, due to increased contact resistance caused by wear in the connector elements may be overcome in a reliable and useful manner.

According to a first aspect of the invention, a method is provided for controlling charging of an electric energy storage system in a vehicle comprising an electric machine which is arranged for propulsion of said vehicle, said method comprising: initiating said charging upon connection of said energy storage system to an external power supply via a first connector element associated with said vehicle and a second connector element associated with said external power supply; and monitoring a contact resistance defined by the connection of said connector elements. The method further comprises: measuring and calculating the power loss over said connector elements during said charging; and generating an error signal if said power loss is higher than a predetermined threshold value, said error signal being dependent on the magnitude of said power loss.

An advantage with the present invention is that it can be used for avoiding urgent and potentially dangerous situations involving excessive heat due to high power loss in the contact point between the connector elements. In particular, an error signal is generated in a potentially harmful situation, wherein the error signal produced is dependent on the magnitude of the power loss, so as to allow various measures to be taken as a result of the error signal being generated.

According to one embodiment, the method comprises classifying said error signal into at least two error categories depending on the magnitude of said calculated power loss. In this manner, an improvement is obtained since different types of erroneous situations can be detected depending on the magnitude of the power loss. Also, different types of corrective measures can be taken depending on the error signal.

Furthermore, according to one embodiment, the method comprises classifying said error signal into at least one of the following error categories: i) a category in which a generated error signal initiates shutting down of said charging; ii) a category in which a generated error signal initiates a decrease of the charging current of said external power supply; and iii) a category in which a generated error signal initiates a signal corresponding to an indication that at least one of said connector elements is being faulty.

In this manner, an advantage is obtained since predictions can be made related for example to the maintenance of the external power supply, the connector elements and other components which may be subject to wear and possible breakdown. This means that different types of actions and corrective measures can be taken depending on the error at hand. The values of the power loss as measured over time can be used as an estimate of the deterioration of the connector elements. In this manner, it may be possible to predict when the connector elements should be replaced or repaired.

According to an aspect, an estimation can be made, based on the error signal, of an expected remaining period of time until at least one of said connector elements needs to be repaired or replaced.

According to one embodiment, the method comprises the steps of: measuring a voltage drop over said connector elements during said charging; measuring the charging current of said external power supply; and calculating said power loss based on the magnitude of the voltage drop and the charging current. This is a reliable and effective way of providing a measurement of the power loss.

According to one embodiment, the method comprises: measuring a first voltage of said first connector means and a second voltage of said second connector means before said charging is initiated; calibrating a measurement of said voltage drop by comparing said first voltage and said second voltage; and initiating said charging by said external power source. This is a so-called pre-charging procedure which is arranged as protection of the various components being used for the charging process.

According to a further embodiment, the method comprises: measuring the temperature associated with a contact point of said connector elements; and calculating said power loss from the magnitude of said temperature. Through the use of values related to the temperature, suitably together with values of the charging current, the power loss can be calculated in a straightforward manner.

According to one embodiment, the method comprises determining said power loss as a function of time and generating said error signal depending on said function of time. This is a further way of refining the manner in which the values of the power loss can be used for predicting maintenance of the connector elements and also avoiding breakdown due to high temperature.

According to a further embodiment, an arrangement is provided for controlling charging of an electric energy storage system in a vehicle comprising an electric machine which is arranged for propulsion of said vehicle, said arrangement comprising a vehicle control unit arranged in said vehicle for initiating charging upon connection of said energy storage system to an external power supply via a first connector element associated with said vehicle and a second connector element associated with said external power supply; said vehicle control unit being configured for monitoring a contact resistance defined by the connection of said connector elements. The control unit comprises a measuring unit for determining the power loss over said connector elements during said charging, said control unit being configured for generating an error signal if said power loss is higher than a predetermined threshold value, wherein said error signal is dependent on the magnitude of said power loss.

According to one embodiment, the arrangement comprises a voltage detector for measuring the voltage drop over said connector elements during said charging; and a current detector for measuring the charging current of said external power supply. The charging control unit is configured for calculating said power loss from the magnitude of the voltage drop and the charging current.

According to one embodiment, the arrangement comprises a temperature sensor for measuring the temperature associated with a contact point of said connector elements; wherein the charging control unit is configured for calculating said power loss from the magnitude of said temperature.

According to a further aspect, the invention relates to a vehicle comprising an arrangement as mentioned above.

According to one embodiment, the invention relates to a computer program comprising program code means for performing the steps of any of the aspects of said method when said program is run on a computer.

According to one embodiment, the invention relates to a computer readable medium carrying a computer program comprising program code means for performing the steps as mentioned above when said program product is run on a computer.

According to one embodiment, the invention relates to a control unit for controlling charging of an electrical storage system in a vehicle comprising an electric machine which is arranged for propulsion of said vehicle, the control unit being configured to perform the steps of the above method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION

Figure 1:
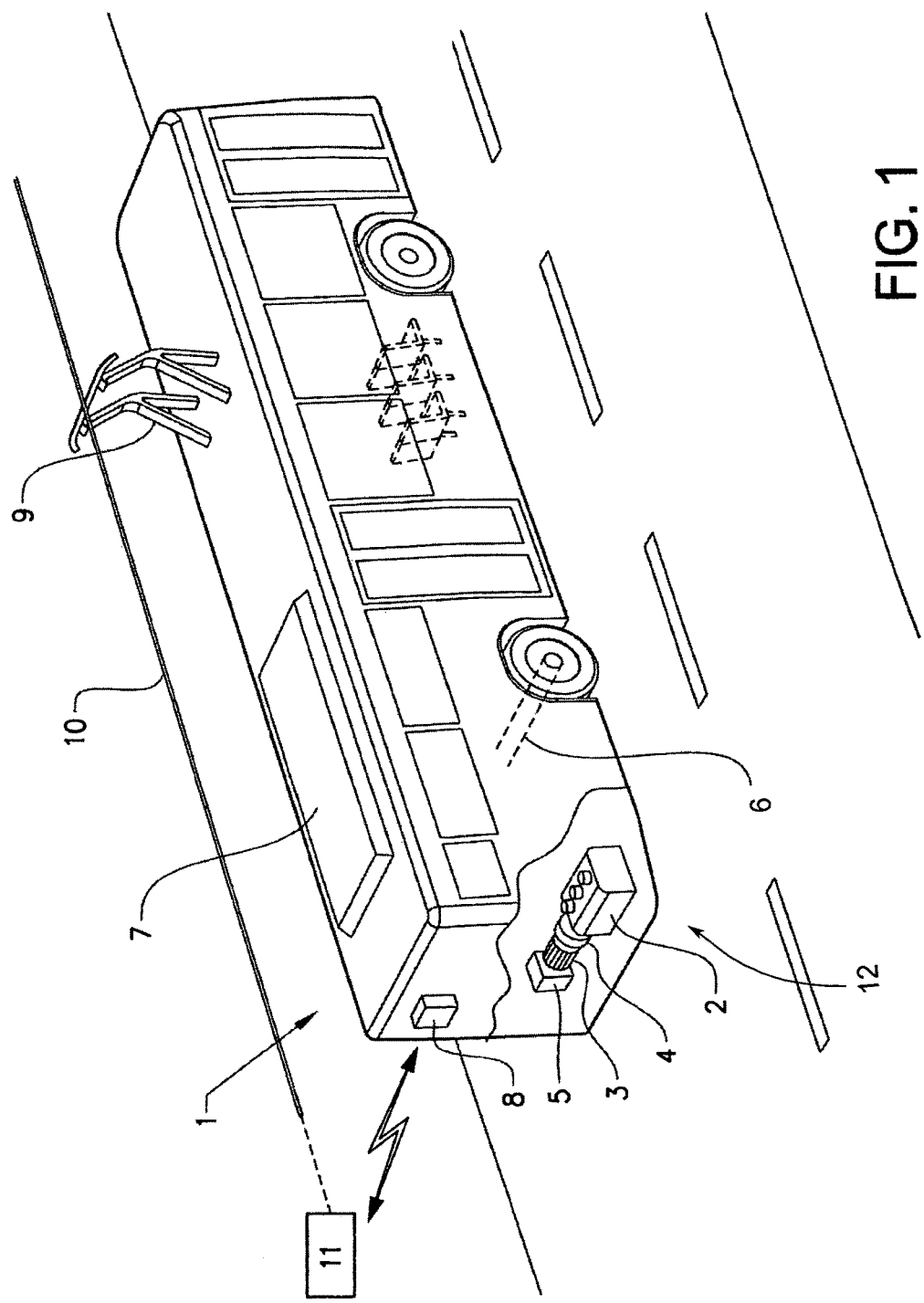
FIG. 1 shows a schematical view of a hybrid vehicle in the form of a bus, in which the present invention can be used.

The invention will now be described with reference to an embodiment and the enclosed drawings. With initial reference to FIG. 1, there is shown a simplified perspective view of a vehicle in the form of a bus 1 which according to an embodiment is of hybrid type. More precisely, the bus 1 is of the so-called plug-in hybrid type which is equipped with an internal combustion engine 2 and an electric machine 3 which are connected to each other via a clutch 4 and wherein both the internal combustion engine 2 and the electrical machine 2 can be used to drive the bus 1.

With reference to FIG. 1, the electric machine 3 is connected to a gearbox 5, which in turn is connected to a rear axle 6 of the bus 1. In a manner which is known as such and is therefore not described in detail, the internal combustion engine 2 and the electric machine 3 can be used for driving the rear axle 6. According to the embodiment, the electric machine 3 is used as a combined electric drive motor and generator, and is suitably also used as a starter motor for the internal combustion engine 2.

The bus 1 carries an electric energy storage system 7 which comprises a set of battery cells and other control circuits. According to the embodiment, the energy storage system 7 is arranged on the roof of the bus 1, as indicated in FIG. 1. The energy storage system 7 comprises a number of battery cells which are connected in series to provide an output DC voltage having a desired voltage level. Suitably, the battery cells are of lithium-ion type but other types may also be used. The energy storage system 7 also comprises control circuits adapted for monitoring the operation of the battery cells.

The various above-mentioned components of the propulsion system of the bus 1 are connected to a vehicle control unit 8, which will be described in greater detail below.

Even though the invention is described with reference to a vehicle in the form of a bus, it can be used for virtually any type of vehicle which is operated by means of at least an electric machine and which has an energy storage system which needs to be recharged periodically. In particular, the invention can be applied in different types of drivelines, for example a parallel hybrid, serial hybrid or fully electric vehicle. Also, as a further example, the electric machine can be arranged both in front of, or after, the gearbox. Consequently, the configuration of the driveline 12 as shown in FIG. 1 is only an example of an embodiment for implementing the invention.

During certain modes of operation of the bus 1, it is suitable to use only the electric machine 3 for operating the bus 1. This means that the energy storage system 7 will deliver the required power to the electric machine 3, which in turn is driving the rear axle 6. During other modes of operation of the bus 1, for example when the state of charge of the energy storage system 7 is determined as not being sufficient for operating the bus 1 by means of the electric machine 3, the internal combustion engine 2 is connected, via the clutch 4 and the gearbox 5, to the rear axle 6. The manner in which an electric machine and an internal combustion engine can be combined and used for operating a vehicle is generally previously known and for this reason, it is not described in any greater detail here.

The bus 1 is equipped with a first electric connector element 9, suitably in the form of a pantograph, which is mounted on the roof of the bus 1. The pantograph 9 is arranged for being connected to a second electric connector element 10 in the form of an overhead electrical conductor wire which is configured for conducting a charging current having a certain voltage.

A pantograph is an electrical connector device which is previously known as such, and which can be positioned on the roof of a bus, a tramway car or similar, and which is adapted to be raised so as to assume an elevated condition in which it comes into contact with an electrically conducting element such as a wire or a rail being positioned over the vehicle. Alternatively, the invention can be arranged with a first connector element on a vehicle which is generally stationary and which cooperates with a second connector element which is configured in a manner so that it may be lowered towards a position in which it is in contact with the first connector element.

In the context of the present invention, the energy storage system 7 can be supplied with an electrical current, by means of the connection between the overhead wire 10 and the pantograph 9, in order to charge the energy storage system 7.

According to the embodiment, the pantograph 9 and the overhead wire 10 are arranged so that charging of the energy storage system 7 takes place while the bus 1 is standing still, i.e. either at a charging station at a bus terminal or at a bus stop or a similar position. Furthermore, the overhead wire 10 forms part of an external power supply 11, as indicated in a schematic manner in FIG. 1. The external power supply 11 is generally configured for feeding a certain charging current with a charging voltage to the wire 10.

FIG. 1 also indicates, in a simplified manner, a vehicle drivetrain 12, which comprises the various components which are necessary to operate the vehicle 1. For example, the internal combustion engine 2, the electric motor 3, the clutch 4, the gearbox 5 and the rear axle 6 form part of the vehicle drivetrain 12, which will be described in further detail below.

A process for charging the energy storage system 7 is initiated when the bus approaches the overhead wire 10 so that the connector elements 9, 10 can come into contact with each other. As described initially, the connector elements 9, 10 are often exposed to environmental influence and wear, such as varying weather conditions, and also ageing due to heavy and intensive use. For this reason, a problem may arise through the fact that the contact surface where the connector elements 9, 10 meet could easily be worn, especially if the connectors are frequently connected and disconnected. All these factors may contribute to wear of the connector elements. If the connector elements are worn, the contact resistance defined by the contact point of the connector elements may increase. If the resistance in the connection is too high, this might lead to a high loss of power in the contact point of the connector elements, which in turn may cause high temperature and even fire. For this reason, there is a desire to avoid such conditions in which there is a risk for too high power loss in the interface between the connector elements.

According to an embodiment, charging of the electrical storage system 7 is initiated upon connection of the electrical storage system 7 to the external power supply 11 via the first connector element 9 and the second connector element 10, and then monitoring a contact resistance defined by the connection of the connector elements 9, 10.

In order to achieve the above-mentioned purpose, it is a basic principle behind the invention that it is arranged for measuring and calculating the power loss over the connector elements 10, 11 during charging. Also, the system is configured so as to generate an error signal if the power loss is higher than a predetermined threshold value. The error signal is dependent on the magnitude of the power loss, which means that the invention can be used for distinguishing between different types of errors and defects related to the connector elements 10, 11.

The invention will now be described in greater detail with reference to FIG. 2, which is a simplified schematic view of relevant parts of the vehicle drivetrain 12 and its connection with the external power supply 11. All components shown in FIG. 1 are not shown in FIG. 2.

As explained above, a charging procedure is initiated when the bus 1 approaches a position in which the external power supply 11 is located. When the bus 1 has reached its parking position, the pantograph 9 is brought into contact with the overhead wire 10. When this has been initiated, the external power supply 11 is configured to start charging of the electrical storage system 7. To this end, the external power supply 11 comprises a charging control unit 13 which is arranged to control a charging current being fed to the overhead wire 10 and for communicating with the vehicle control unit 8 in order to control the charging process.

Figure 2:
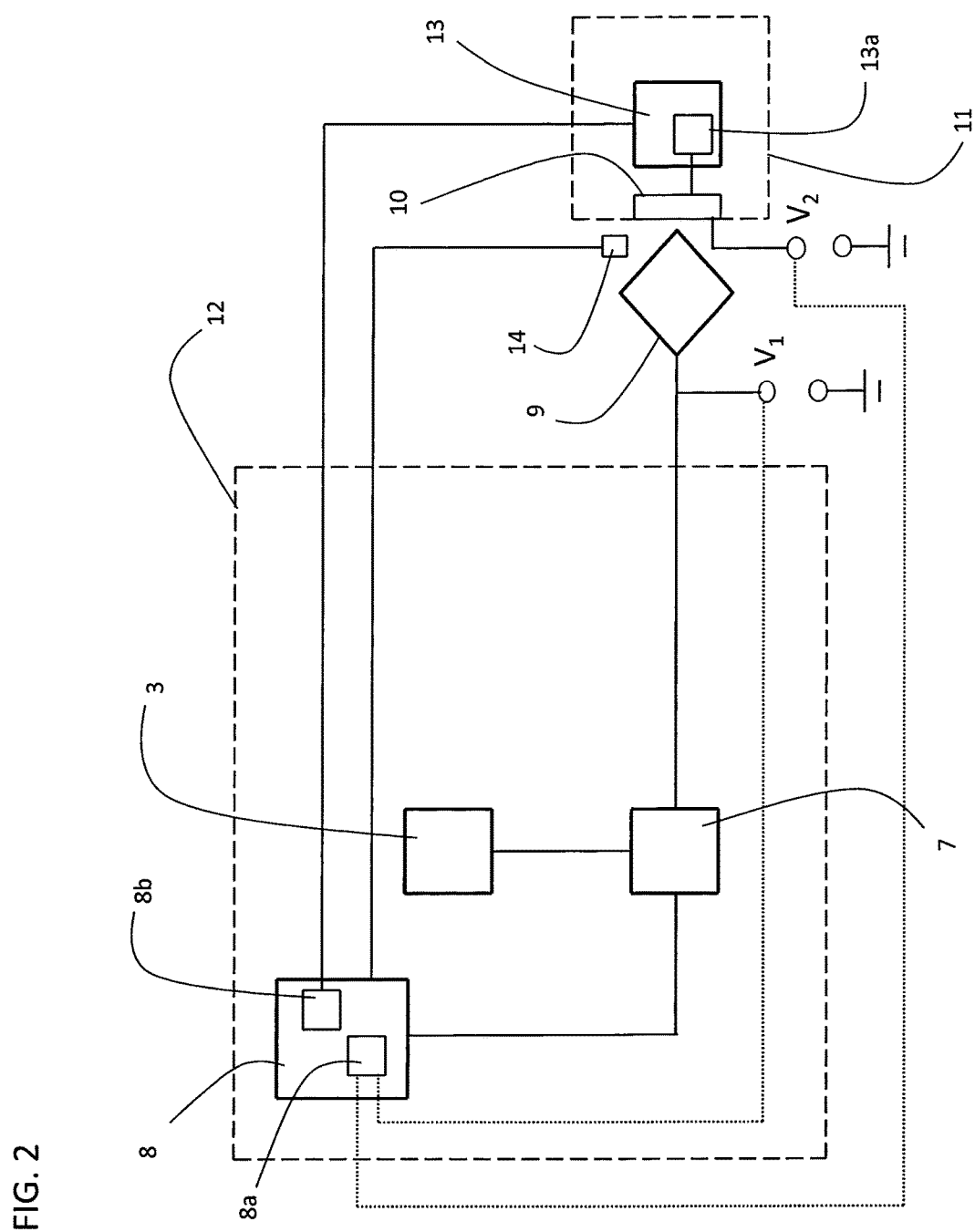
FIG. 2 is a schematic view of a drivetrain for a vehicle and an external charging control unit, in accordance with the principles of the invention.

As shown in FIG. 2, the pantograph 9 is connected to the electrical energy storage system 7, which in turn is used to power the electric machine 3. Furthermore, the energy storage system 7 is also connected to the vehicle control unit 8, which comprises a voltage detector 8a for measuring the voltage drop over the connector elements 9, 10. More precisely, the voltage detector 8a is connected to the first connector element 9 in order to measure a first voltage V1 and also connected to the second connector element 10 in order to measure a second voltage V2, as indicated in FIG. 2.

Furthermore, the external charger control unit 13 comprises a current detector 13a which is configured for measuring the current used for charging the energy storage system 7. The vehicle control unit 8 comprises a communication unit 8b which is configured for communicating with the external charging control unit 13 in order to obtain information related to the charging current. In this manner, the vehicle control unit 8 is configured for calculating said power loss from information relating to the magnitude of the voltage drop and the charging current, and for generating an error signal if the power loss is higher than a predetermined threshold value. As mentioned above, the actual error signal depends on the magnitude of the power loss.

An embodiment of the invention will now be described with reference to FIG. 3, which is a flow chart showing the principles of a process for charging the energy storage system 7 as mentioned above. As indicated in a first method step 15 (see FIG. 3), the process is initiated by connecting the energy storage system 7 to the external power supply 11. As mentioned, this connection is carried out via the first connector element 9 on the vehicle 1 and the second connector element 10 which is provided in the external power supply 11. After connecting the connector elements 9, 10, the charging of the energy storage system 7 is initiated (step 16).

Figure 3:
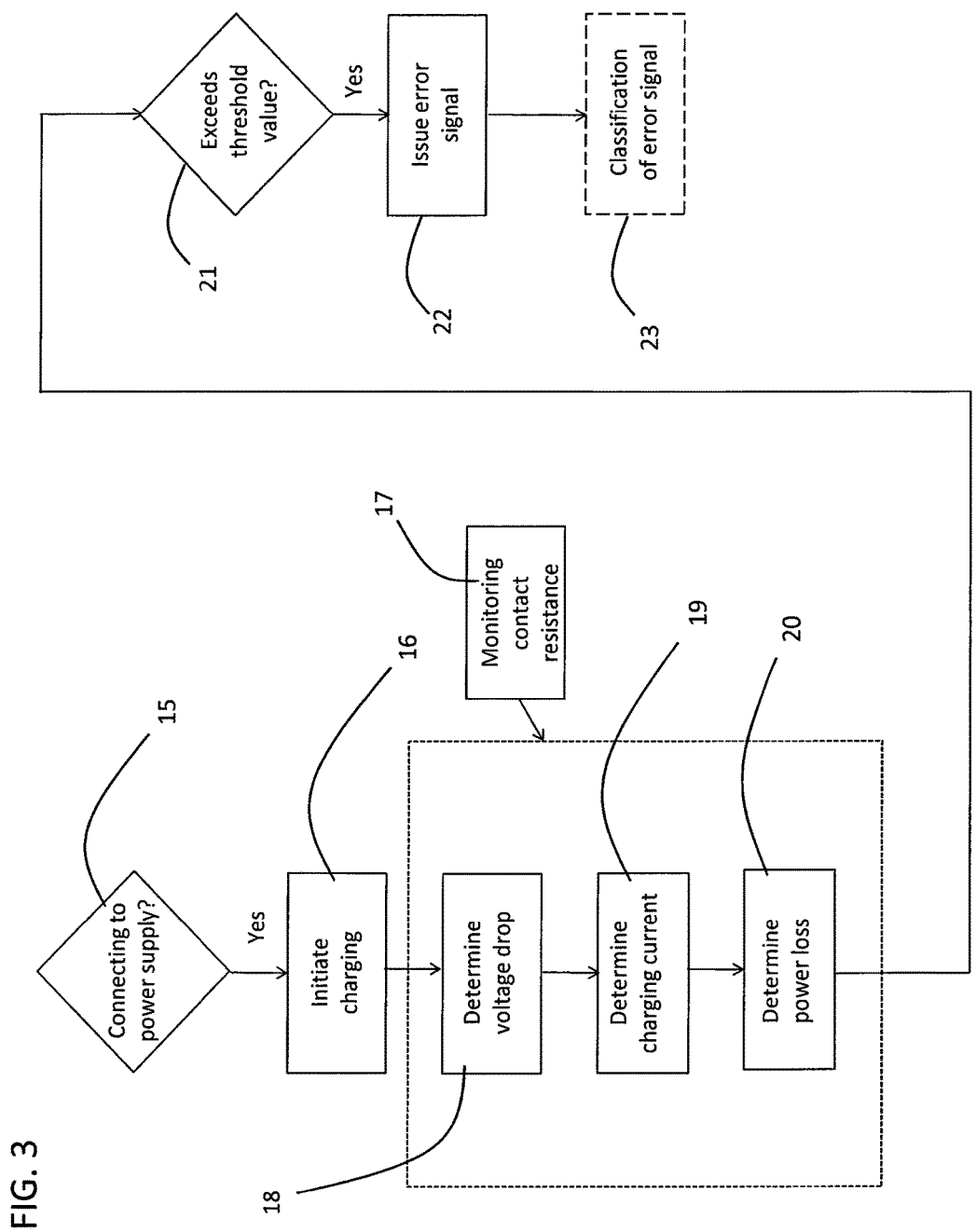
FIG. 3 is a flow chart showing the principles of a method according to the invention.

The embodiment is based on the principle that the contact resistance defined by the connection of the connector elements 9, 10 is monitored, as indicated by reference numeral 17 in FIG. 3. The contact resistance is represented by a measurement of the power loss over the connector elements 9, 10. More precisely, and according to the embodiment, the power loss is determined by measuring the voltage drop over the connector elements 9, 10 (step 18 in FIG. 3) and the charging current as described above (step 19 in FIG. 3). This results in a measurement of the power loss (step 20 in FIG. 3), the magnitude of which is compared with a specified threshold value (step 21 in FIG. 3).

If the magnitude of the power loss is higher than a predetermined threshold value (step 21 in FIG. 3), an error signal will be generated (step 22 in FIG. 3). This is consequently an indication that the connector elements 9, 10 are in a condition in which there is a risk of overheating, or even fire. The error signal is dependent on the magnitude of the power loss. This means that the error signal may vary and assume different values depending on the magnitude of the power loss. These different values may subsequently be used for determining actions or corrective measures in order to overcome the risk of overheating.

According to an aspect—which is indicated in FIG. 3 as step 23, with broken lines—the error signal is classified into at least two error categories depending on the magnitude of said calculated power loss. For example, in the event that the power loss is relatively low, this can be an indication that the charging current must be decreased by means of the external power supply in order not to risk any overheating or fire. If the power loss is relatively high, this can be an indication that the pantograph is faulty and needs to be replaced. Finally, if the power loss is extremely high, this can be an indication that the charging must be shut off immediately, since otherwise there may be a high risk for a fire or other types of breakdown of the charging equipment.

Consequently, the invention allows certain predictions to be made as regards the maintenance of the connector elements 9, 10 and other parts of the equipment used for charging the electrical storage system 7. In particular, according to an aspect, measurements of the power loss or the voltage drop can be used for calculating an estimated remaining period of time which will lapse until at least one of the connector elements 9, 10 can be expected to be so worn out so that it needs to be replaced or repaired. Such estimations can be based on data related to the expected ageing of connector elements.

According to an aspect, a so-called pre-charging process can be implemented in order to calibrate the measurements of the voltage drop over the connector elements 9, 10. This calibration process is initiated by connecting the connector elements 9, 10 (before the actual charging is initiated). After this connection, the voltage V1 of the pantograph 9 and the voltage V2 of the overhead wire 10 are measured and compared and used as a calibration of the voltage measurements when the actual charging of the energy storage system 7 is carried out. For example, if the voltage V1 of the pantograph 9 is 601 V and the voltage V2 of the overhead wire 10 is 599 V as measured during this calibration process, it can be determined that any subsequent measurements of the voltage V2 of the overhead wire 10 should be deducted by 2 V in order to be calibrated with the measurements of the voltage V1 of the pantograph 9.

According to an aspect, a temperature sensor 14 is used for measuring the temperature in the vicinity of the connector elements 9, 10. As indicated in FIG. 2, the temperature sensor 14 is connected to the vehicle control unit 8 so as to provide a value of the measured temperature. Furthermore, the temperature values can be used, together with the value of the charging current, as a measure of the power loss over the connector elements 9, 10.

In a further aspect, it is suitable to adjust the value of the power loss as calculated by means of the temperature sensor 14 with one or more factors, the magnitude of which depend on environmental conditions such as weather and wind conditions. This is due to the fact that the measured temperature values can be said to be influenced by such environmental conditions.

In summary, the power loss over the connector elements 9, 10 can be determined through the use of measurements of the voltage drop over said connector elements 9, 10 (together with measurements of the charging current) or through the use of measurements of the temperature in the vicinity of the connector elements 9, 10 (together with measurements of the charging current). If the power loss is higher than a specified threshold value, an error signal is generated. As explained above, the error signal produced is made dependent on the magnitude of the power loss, so as to allow predictions to be made as regards the maintenance of the connector elements 9, 10 and other associated components related to the charging of the energy storage system 7.

It should be noted that although the above-mentioned embodiment includes a control unit 8 (see FIG. 2) which is arranged on a vehicle 1, such a control unit 8 may alternatively be arranged in connection with the external power supply 11. In the event that the control unit is arranged in the external power supply 11 (and not, as shown in FIG. 2, on the vehicle 1), it will be necessary to provide means for communication between the external power supply 11 and the vehicle 1. More precisely, in case a control unit is arranged in the external power supply 11 for calculating the power loss associated with the connectors 9, 10 and generating an error signal if the power loss is higher than a certain predetermined value, it must be configured to transmit information to the vehicle 1 in order to terminate any condition which caused the error signal to be generated, for example by disconnecting the first connector 9 from the second connector 10.

A further aspect of the invention will now be described, with reference to an embodiment in which the vehicle control unit 8 is arranged as described on FIG. 2, i.e. on the vehicle 1. In such a case, it can be expected that a vehicle 1 is being in operation during a certain time period. During this time period, the vehicle 1 will normally stop at a number of charging sites, generally as shown in FIG. 1, so that the energy storage system 7 of the vehicle can be charged. If measurements are carried out as described above at each charging site, an error signal will be generated at each charging site in which the power loss associated with the connectors 9, 10 is higher than a predetermined threshold value. If an error signal is generated at one single charging site, but not at any other charging site, it can be determined that the charging site at which the error signal was generated has an overhead wire 10 which is worn and should be replaced. Consequently, the pantograph 9 on the vehicle 1 is not faulty.

It is to be understood that the present invention is not limited to the embodiments described above and illustrated in the drawings; rather, the skilled person will recognize that many changes and modifications may be made within the scope of the appended claims.

For example, the connector elements can be a pantograph on the vehicle which is connected to an overhead wire associated with an external power supply, or can alternatively be, for example, a power socket on the vehicle cooperating with a plug-in connector associated with the external power supply.

The invention claimed is:

1. A method for controlling charging of an electric energy storage system in a vehicle comprising an electric machine which is arranged for propulsion of the vehicle, the method comprising:
   initiating the charging upon connection of the energy storage system to an external power supply via a first connector element associated with the vehicle and a second connector element associated with the external power supply;
   measuring and calculating the power loss over the connector elements during the charging by;
   measuring a voltage drop over the connector elements during the charging;
   measuring the charging current of the external power supply; and
   calculating the power loss based on the magnitude of the voltage drop and the charging current;
   generating an error signal if the power loss is higher than a predetermined threshold value, the error signal being dependent on the magnitude of the power loss; and
   estimating, based on the error signal and data related to the expected ageing of the connector elements, an expected remaining period of time until at least one of the connector elements needs to be repaired or replaced.

2. A method according to claim 1, further comprising:
   classifying the error signal into at least two error categories depending on the magnitude of the calculated power loss.

3. A method according to claim 2, further comprising:
   classifying the error signal into at least one of the following error categories:
   i) a category in which a generated error signal initiates shutting down of the charging;
   ii) a category in which a generated error signal initiates a decrease of the charging current of the external power supply; and
   iii) a category in which a generated error signal initiates a signal corresponding to an indication that at least one of the connector elements is being faulty.

4. Method according to claim 1, further comprising:
measuring the temperature associated with a contact point of the connector elements;
calculating the power loss from the magnitude of the temperature.

5. Method according to claim 1, further comprising:
determining the power loss as a function of time and representing an estimate of the deterioration of the connector elements; and
generating the error signal depending on the function of time.

6. A vehicle comprising an arrangement according to claim 5.

7. A computer comprising a program for performing the steps of claim 1 when the program is run on the computer.

8. A non-transitory computer readable medium carrying a computer program c for performing the steps of claim 1 when the program product is run on a computer.

9. A control unit for controlling charging of an electric energy storage system in a vehicle comprising an electric machine which is arranged for propulsion of the vehicle, the control unit being configured to perform the steps of the method according to claim 1.

10. A method for controlling charging of an electric energy storage system in a vehicle comprising an electric machine which is arranged for propulsion of the vehicle, the method comprising:
initiating the charging upon connection of the energy storage system to an external power supply via a first connector element associated with the vehicle and a second connector element associated with the external power supply;
measuring and calculating the power kiss over the connector elements during the charging by;
measuring a voltage drop over the connector elements during the charging;
measuring the charging current of the external power supply; and
calculating the power loss based on the magnitude of the voltage drop and the charging current;
generating an error signal if the power loss is higher than a predetermined threshold value, the error signal being dependent on the magnitude of the power loss;
measuring a first voltage of the first connector means and a second voltage of the second connector means before the charging is initiated;
calibrating a measurement of the voltage drop by comparing the first voltage and the second voltage; and
initiating the charging by the external power source.

11. Method according to claim 10, further comprising:
initiating the charging only after the step of calibrating a measurement of the voltage drop has been carried out.

12. A control unit for controlling charging of an electric energy storage system in a vehicle comprising an electric machine which is arranged for propulsion of the vehicle, the control unit being configured to perform the steps of the method according to claim 10.

13. An arrangement for controlling charging of an electric energy storage system in a vehicle comprising an electric machine which is arranged for propulsion of the vehicle, the array arrangement comprising a vehicle control unit arranged in the vehicle for initiating charging upon connection of the energy storage system to an external power supply via a first connector element associated with the vehicle and a second connector element associated with the external power supply; wherein the control unit comprises a measuring unit for determining the power loss over the connector elements during the charging by the arrangement comprising:
a voltage detector for measuring the voltage drop over the connector elements during the charging; and
current detector for measuring the charging current of the external power supply; wherein
the control unit is configured for calculating the power loss from the magnitude of the voltage drop and the charging current, for generating an error signal if the power loss is higher than a predetermined threshold value, wherein the error signal is dependent on the magnitude of the power loss, and for estimating, based on the error signal and data related to the expected aging of the connector elements, an expected remaining period of time until at least one of the connector elements needs to be repaired or replaced.

14. Arrangement according to claim 13, further comprising:
a temperature sensor for measuring the temperature associated with a contact point of the connector elements; wherein
the charging control unit is configured for calculating the power loss from the magnitude of the temperature.

15. An arrangement for controlling charging of an electric energy storage system in a vehicle comprising an electric machine which is arranged for propulsion of the vehicle, the arrangement comprising a vehicle control unit arranged in the vehicle for initiating charging upon connection of the energy storage system to an external power supply via a first connector element associated with the vehicle and a second connector element associated with the external power supply; wherein the control unit comprises a measuring unit for determining the power loss over the connector elements during the charging by the arrangement comprising:
a voltage detector for measuring the voltage drop over the connector elements during the charging; and
a current detector for measuring the charging current of the external power supply; wherein
the control unit is configured for calculating the power loss from the magnitude of the voltage drop and the charging current, for generating an error signal if the power loss is higher than a predetermined threshold value, wherein the error signal is dependent on the magnitude of the power loss, for measuring a first voltage of the first connector means and a second voltage of the second connector means before the charging is initiated, for calibrating a measurement of the voltage drop by, comparing the first voltage and the second voltage, and for initiating the charging by the external power source.

\* \* \* \* \*